United States Patent [19]

Schröder

[11] Patent Number: 5,598,146
[45] Date of Patent: Jan. 28, 1997

[54] RAIN SENSOR

[75] Inventor: Hans-Joachim Schröder, Wiesbaden, Germany

[73] Assignee: VDO Adolf Schindling AG, Frankfurt, Germany

[21] Appl. No.: 500,417

[22] Filed: Jul. 10, 1995

[30] Foreign Application Priority Data

Jul. 11, 1994 [DE] Germany .................. 44 24 028.7

[51] Int. Cl.⁶ ............................................. G08B 21/00
[52] U.S. Cl. .................................... 340/602; 318/444
[58] Field of Search .................... 340/602, 603, 340/620, 601; 318/443, 444, DIG. 2; 307/10.1; 15/250.17

[56] References Cited

U.S. PATENT DOCUMENTS

| Re. 33,308 | 8/1990 | Millerd et al. | 318/444 |
|---|---|---|---|
| 4,554,493 | 11/1985 | Armstrong | 318/444 |
| 4,665,351 | 5/1987 | Nyberg | 340/602 |
| 4,705,998 | 11/1987 | Millerd et al. | 318/444 |
| 4,942,349 | 7/1990 | Millerd et al. | 318/483 |
| 5,057,754 | 10/1991 | Bell | 318/483 |
| 5,140,234 | 8/1992 | Wallrafen | 318/264 |
| 5,239,244 | 8/1993 | Teder | 318/443 |
| 5,306,992 | 4/1994 | Droge | 318/483 |
| 5,493,190 | 2/1996 | Mueller | 318/443 |

*Primary Examiner*—John K. Peng
*Assistant Examiner*—Timothy Edwards, Jr.
*Attorney, Agent, or Firm*—Martin A. Farber

[57] ABSTRACT

A rain sensor which is arranged on the outside of the windshield of a motor vehicle in a region which can be passed over by a windshield wiper and has at least one conductive track which is connected to an electric potential within the motor vehicle. A loop resistance of the conductive track (1, 2) is measured for the electrical detection of a tear.

8 Claims, 4 Drawing Sheets

RAIN SENSOR

FIELD AND BACKGROUND OF THE INVENTION

The present invention relates to a rain sensor which is arranged on the outside of the windshield of a motor vehicle in the region of the windshield wiper and has at least one conductive track which is connected with an electric voltage within the vehicle.

It is known to arrange rain sensors on the windshield of a motor vehicle in the region of the windshield wiper.

These rain sensors give an electric signal to an evaluation circuit within the motor vehicle as a function of the amount of water present at the time on the windshield of the vehicle.

In this connection, the sensors have resistance structures in the form of two strip-shaped conductive tracks which are interlaced in each other. Each conductive track is connected to one potential of the evaluation circuit. If drops of water contact both conductive tracks, a conductive connection is created between them. The total resistance of the sensor structure is thus changed. This change in resistance can be used in order to control a windshield wiper automatically.

In sensors which are located on the outside of the vehicle windshield, the conductive tracks are extended over the edge of the windshield into the inside of the vehicle. In this case, there is the possibility of the conductive track being torn.

The evaluation electronics can, however, not distinguish between a tear of the conductive track and a dry windshield, since a high total resistance of the rain sensor is detected in both cases. If there is water on the windshield, the failure to recognize a tear in the conductive track leads to an incorrect control of the windshield wiper and thus to the danger that the windshield will not be sufficiently cleaned despite the fact that water is present.

SUMMARY OF THE INVENTION

The object of the invention is thus to provide an arrangement for the reliable recognition of a tear in a conductive track of a rain sensor which is arranged on the outside of the windshield of the vehicle.

In accordance with the invention, this object is achieved in the manner that a loop resistance of the conductive track can be measured for the electrical detection of a tear.

The advantage of the invention is that a dependable indication for detection of a tear in the conductive track is obtained by a measurement of the resistance of the conductive track. In this connection, it is of particular importance that due to the closed measurement circuit, no parasitic voltages can be formed. Falsification of the result of the measurement is thus excluded.

In one embodiment, an auxiliary conductive track is provided on the windshield, this auxiliary track being electrically connected to the conductive track and extending over the edge of the windshield of the vehicle from the outside into the inside of the vehicle.

In order to keep the space taken up by the sensor structure on the windshield as small as possible, the auxiliary conductive track is arranged parallel to the longitudinal direction of the conductive track and is connected to the conductive track at the end of the sensor structure opposite the edge of the windshield.

The sensor structure of the invention can be produced in particularly simple and inexpensive fashion by a thin-film technique, since it is merely necessary to modify a stencil in order to include the auxiliary conductive track.

For the recognition of a tear, the conductive track and the auxiliary conductive track are each connected to a terminal of a tear detection device present within the vehicle, the conductive track being connected furthermore with the potential of an evaluation circuit for the control of the windshield wiper.

BRIEF DESCRIPTION OF THE DRAWINGS

With the above and other advantages in view, the present invention will become more clearly understood in connection with the detailed description of the preferred embodiments, when considered with the accompanying drawings of which:

FIG. 4 shows diagrammatically the ordinary structure of a resistive rain sensor which is arranged on the outside of the windshield of a motor vehicle in the region of the windshield wiper. Only the edge SR of the windshield is indicated in the figure.

DETAILED DESCRIPTION OF THE PREFERRED EMBODIMENTS

Figure 1:
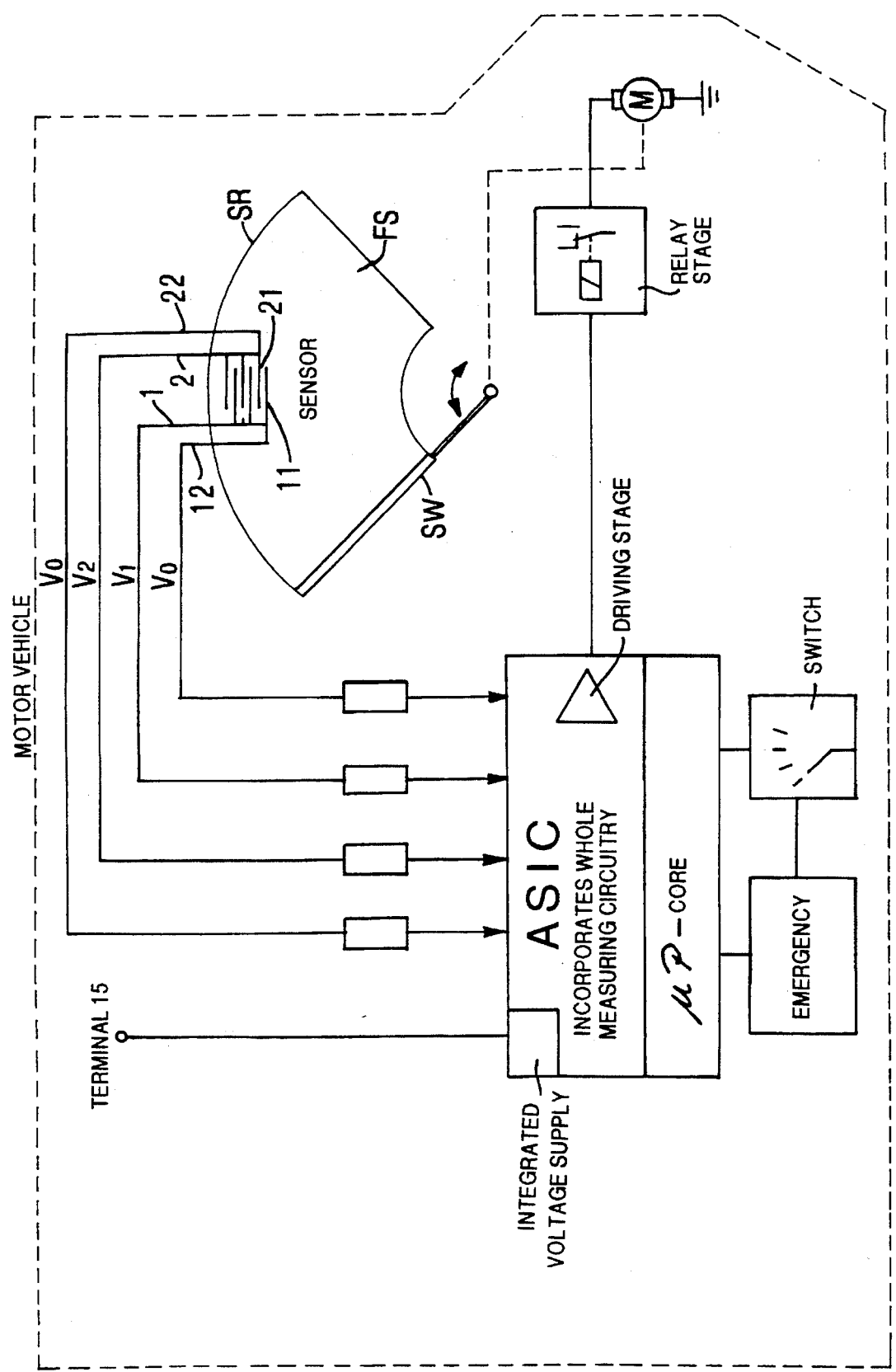
FIG. 1 is a schematic of an elective circuit operative with the rain sensor.

Two sensor conductive tracks 1 and 2 which are developed in comb-like shape are arranged with conductive track sections 11 and 21 engaging one within the other. In a dry state of the windshield, there is sufficient electric insulation between the sensor conductive tracks 1 and 2 due to a spacing present between the conductive tracks 1 and 2. The sensor structure shown thus has a high total resistance when the windshield is dry.

The sensor conductive tracks 1 and 2 preferably consist of chromium and chromium nitride. They are a few atomic layers thick and are applied to the windshield of the vehicle by a thin-film process.

The sensor conductive tracks 1 and 2 extend over the windshield edge SR into the inside of the vehicle and are connected via electric feed lines having the potentials V1 and V2 to the evaluation unit 3 (merely indicated diagrammatically) for the control of the windshield wiper. This evaluation unit 3 monitors the change in the total resistance of the sensor structure, this resistance decreasing upon an increase in wetness. Based on the measured signal, the windshield wiper is automatically controlled via the evaluation unit 3.

The sensor conductive tracks 1 and 2 have, in their longitudinal direction, auxiliary conductive tracks 12 and 22 respectively which are connected at the ends height of the conductive-track sections 11 and 21 respectively furthest from the edge of the windshield to the corresponding conductive tracks 1 and 2 respectively. The auxiliary conductive tracks 12 and 22 are of substantially smaller geometric dimensions in width than the conductive tracks 1 and 2.

The auxiliary conductive tracks 12 and 22, in the same way as the conductive tracks 1 and 2, extend from the outside of the windshield over its edge SR into the inside of the vehicle. The auxiliary conductive track 12 is connected to a tear-detection circuit 13 located within the vehicle, the second terminal of which extends to the sensor conductive track 1 and the potential V1 of the evaluation circuit 3.

In the same way, the auxiliary conductive track 22 is connected to a second tear-detection circuit 23. The second terminal of the tear-detection circuit 23 is connected to the second potential V2 of the evaluation circuit 3 and the conductive track 2.

The loop resistance of each of the conductive tracks 1 and 2 with their respective auxiliary conductive paths 12 and 22 can thus be measured independently of the other potential.

The tear-detection devices 13 and 23 compare the measured resistance at given time intervals with a reference resistance which can easily be determined from the geometry of the conductive track as well as from the properties of the material.

The signals given off corresponding to the comparison of the resistance by the tear-detection circuits 13 and 23 can be fed to the evaluation circuit 3 in order to control the windshield wiper which, when a tear in the line is detected, switches the automatic windshield wiper control to intermittent operation.

The switching can be effected in particularly simple manner by the use of a microprocessor. The microprocessor can perform both the function of detecting a tear and the actual monitoring of the sensor resistance for the automatic control of the windshield wiper.

Figure 2:
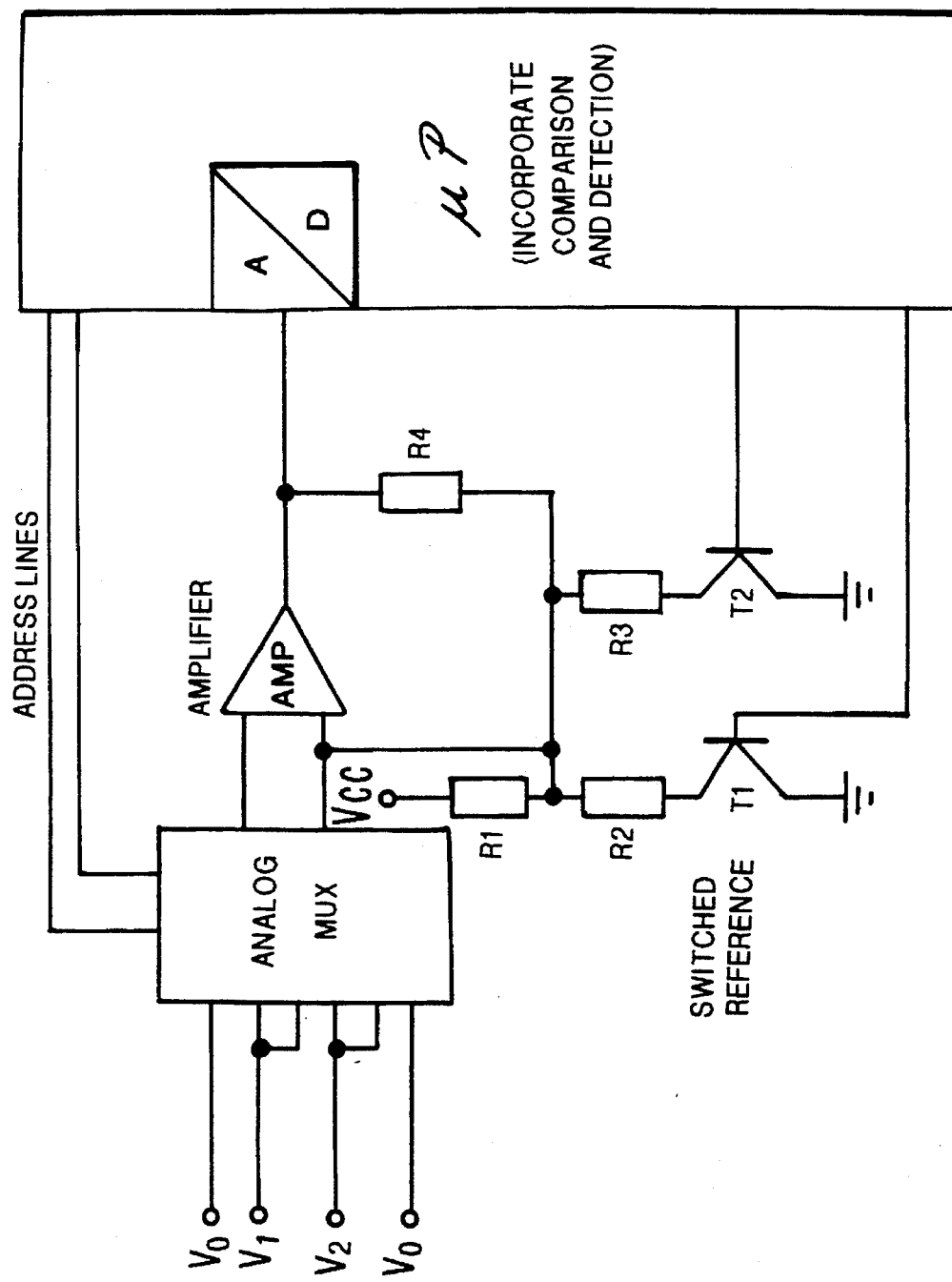
FIG. 2 is an alternative embodiment of the circuit of FIG. 1.
Figure 3:
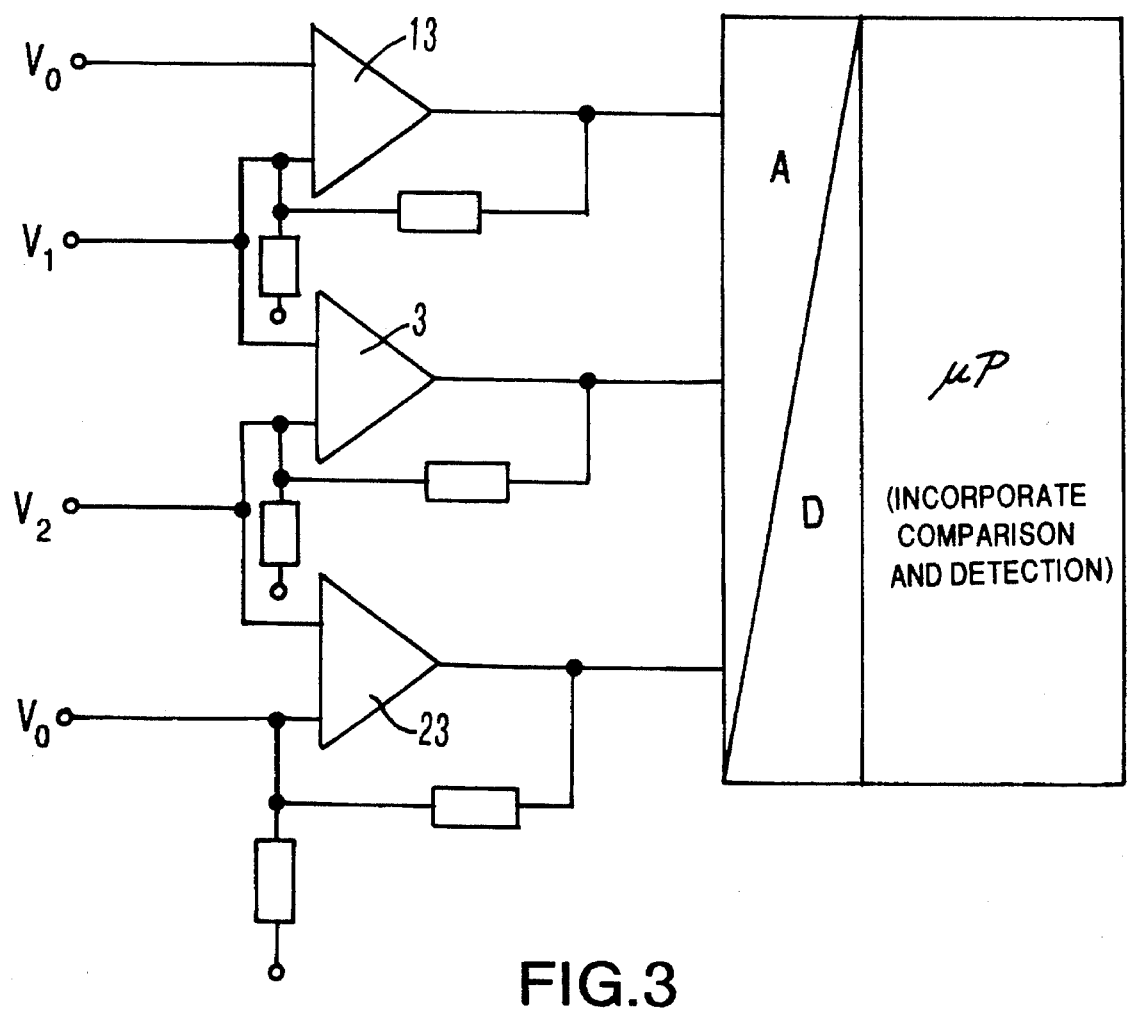
FIG. 3 is a further embodiment of the circuit of FIG. 1.
Figure 4:
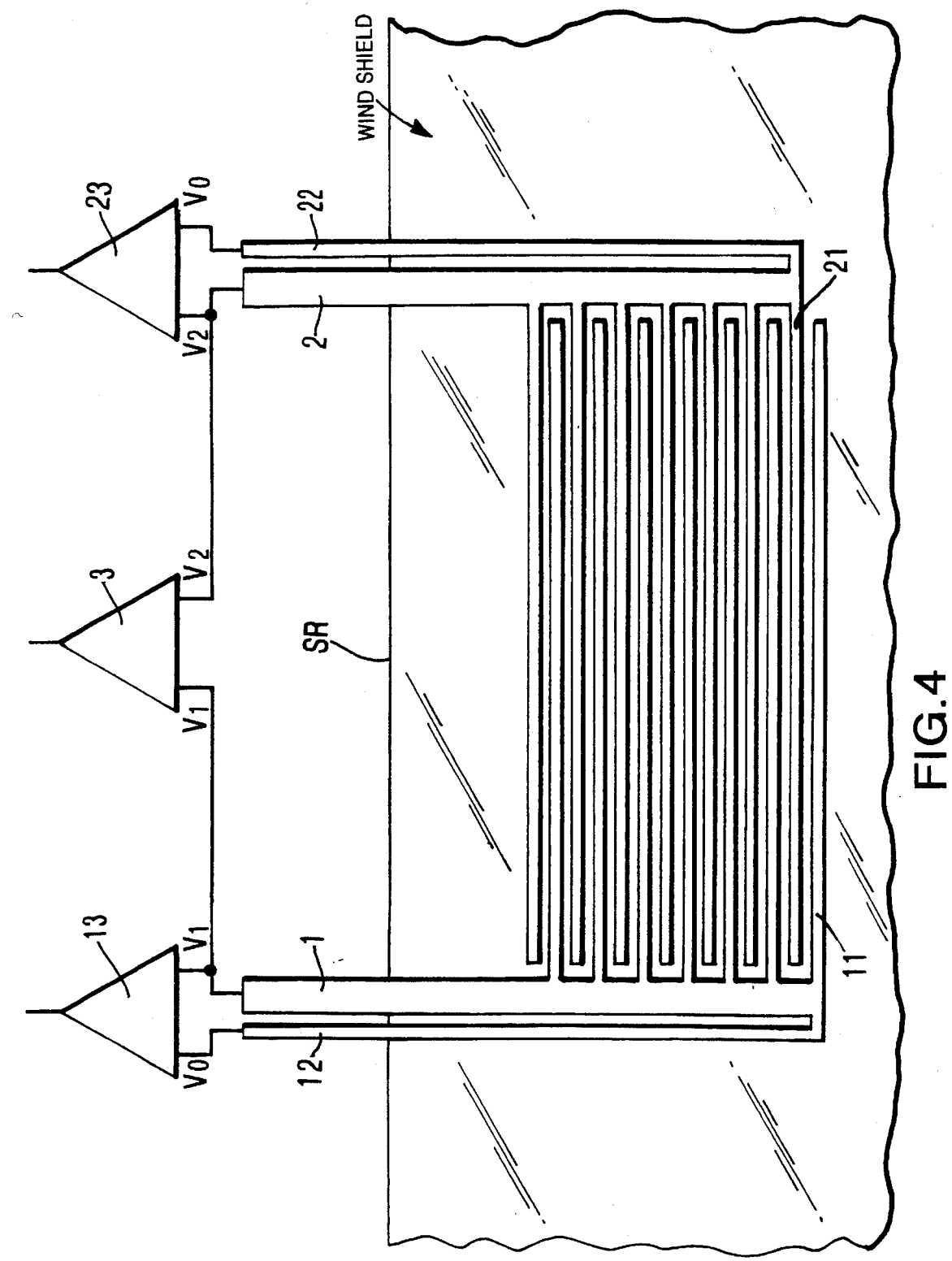
FIG. 4 shows detailed electrical connection to the rain sensor.

FIGS. 1 to 3 show different embodiments of the circuit of the invention.

In accordance with FIG. 1, the resistive rain sensor is arranged on the windshield FS in the region of the windshield wiper SW. The sensor conductive tracks 1 and 2 as well as the auxiliary conductive tracks 12 and 22 extend over the edge of the windshield SR into the inside of the vehicle. Different voltages V0, V1 and V2 are present on the individual conductive tracks, leading via protective resistors to an application specific integrated circuit (ASIC). This ASIC circuit contains a microprocessor core as well as all circuits necessary for effecting the measurement. This ASIC circuit is connected to the car voltage terminal 15.

The ASIC circuit monitors the voltages present on the conductive tracks, compares them with each other, and via its driver stage, sends a signal to the relay which correspondingly activates the windshield wiper motor. If a line tear is detected, the windshield wiper is switched to intermittent operation by an emergency control.

In FIG. 2, the conductive tracks having the voltages V0, V1 and V2 are connected to an analog multiplexer which is controlled by the microprocessor via an address bus. In this way, it is determined which of the voltages present at the input of the analog multiplexer are being further processed. This voltage is forwarded via an amplifier to an analog/digital convertor which is part of the microprocessor. The microprocessor itself carries out the measurement and the comparison of the voltages present. By means of variable references comprising transistor T1, and resistor R1 and R2, and transistor T2, and resistors R1 and R3, different threshold values for the measurements are established. A further resistor R4 is connected from an output terminal of the amplifier to a common junction of resistors R1, R2 and R3 with an input terminal of the amplifier.

In FIG. 3, the voltages are compared to each other by means of separate comparators 13, 23, 3. Each comparator has a feedback network. The signal present at the output of the corresponding comparator corresponds to the change in resistance on the rain sensor. These signals pass via an A/D convertor also to a microprocessor which receives and compares them.

The output signals of the microprocessor are used, similar to the manner shown in FIG. 1, for controlling the windshield wiper on the windshield of the vehicle.

I claim:

1. A rain sensor located on the outside of the windshield of a motor vehicle in a region passed over by a windshield wiper, the sensor comprising:

at least one conductive track which is connected to an electric potential within the motor vehicle, wherein said at least one conductive track configured as a loop to permit measurement of a loop resistance of the conductive track for an electrical detection of a tear in said at least one conductive track.

2. A rain sensor according to claim 1, wherein said loop comprises a base conductive track and an auxiliary conductive track located on the windshield, said auxiliary track being connected electrically to said base conductive track and extending over an edge of the windshield from the outside of the vehicle into the inside of the vehicle.

3. A rain sensor according to claim 2, wherein said auxiliary conductive track is parallel to the longitudinal direction of said base conductive track, and is connected to the base conductive track at an end of the sensor structure distant from the edge of the windshield of the vehicle.

4. A rain sensor according to claim 2, wherein said base conductive track and said auxiliary conductive track comprise a thin-film.

5. A circuit for detecting a tear in the conductive track of a rain sensor A rain sensor located on the outside of the windshield of a motor vehicle in a region passed over by a windshield wiper, the sensor comprising:

at least one conductive track which is connected to an electric potential within the motor vehicle, wherein said at least one conductive track configured as a loop to permit measurement of a loop resistance of the conductive track for an electrical detection of a tear in said at least one conductive track.

a rain sensor according to claim 2, wherein said auxiliary conductive track is parallel to the longitudinal direction of said base conductive track, and is connected to the base conductive track at an end of the sensor structure distant from the edge of the windshield of the vehicle;

said detecting circuit comprises a tear detection device located within the vehicle, and an evaluation circuit for controlling the windshield wiper; and said base conductive track and said auxiliary conductive track are each connected to a terminal of said tear detection device, said base conductive track being connected to a terminal of said evaluation circuit.

6. A circuit according to claim 5, further comprising an emergency control;

wherein upon recognition of a tear in the conductive track by said tear detection device, said evaluation circuit switches said windshield wipers to said emergency control.

7. A circuit according to claim 6, wherein said emergency control provides for intermittent operation of said windshield wipers.

8. A circuit according to claim 5, wherein said tear detection device is a part of said evaluation circuit for controlling the windshield wiper.

* * * * *